Patented Oct. 19, 1943

2,332,263

UNITED STATES PATENT OFFICE 2,332,263

METHOD OF TACKIFYING SYNTHETIC RUBBER

Donald V. Sarbach, Cuyahoga Falls, Ohio, assignor to The B. F. Goodrich Company, New York, N. Y., a corporation of New York No Drawing. Application March 25, 1941, Serial No. 385,141

6 Claims. (Cl. 117—139)

This invention relates to a method of tackifying synthetic rubber, and to a liquid which may be applied to synthetic rubber surfaces to produce excellent tack thereon.

One of the outstanding characteristics of natural rubber is its tack, by which is meant the property of adhering to itself. Two pieces of natural crude rubber which do not feel sticky or adhere well to other materials may be so tightly adhered to each other by merely pressing them together that it is impossible to pull the pieces apart without tearing the rubber. Certain synthetic rubbers such as copolymers of butadiene-1,3 (hereinafter called butadiene) and acrylonitrile do not possess this valuable property. One of the greatest difficulties encountered in the use of such synthetic rubbers to manufacture tires, tubing, and similar articles where several plies of rubber are superposed has been the inability to obtain good adhesion between adjacent layers of synthetic rubber.

It is an object of this invention to provide a method whereby the surface of non-tacky synthetic rubber may be rendered tacky. It is a further object of this invention to provide tackifying solutions which may be applied to the surface of synthetic rubber. Further objects will appear from the following description of the invention.

I have discovered that unvulcanized synthetic rubber surfaces may be rendered tacky by applying thereto a solution of an alkyl phthalyl alkyl glycollate in which the alkyl groups contain not more than six carbon atoms in a straight chain. The alkyl group may accordingly consist of the methyl, ethyl, isopropyl, butyl, act. amyl, n-hexyl, 2-ethylhexyl, and similar groups. Specific alkyl phthalyl alkyl glycollates which may be employed include methyl phthalyl methyl glycollate, methyl phthalyl ethyl glycollate, ethyl phthalyl methyl glycollate, ethyl phthalyl ethyl glycollate, butyl phthalyl butyl glycollate, etc.

To prepare the tackifying solution, the alkyl phthalyl alkyl glycollate is dissolved in a volatile organic solvent in such proportions that the solution contains not more than about 20% by volume of the glycollate. The best volatile organic solvents for this purpose contain oxygen or halogen, although other volatile organic compounds in which the glycollate is soluble such as aromatic hydrocarbons may be employed. Examples of suitable materials include acetone, methyl ethyl ketone, chloroform, ethyl acetate, isopropyl chloride, ethylene dichloride, benzyl alcohol, and toluene. The solvent may also consist of a mixture of materials such as a mixture of equal volumes of acetone and isopropyl chloride.

The solution of the glycollate may be applied to the synthetic rubber surface by any desired method as by brushing or by dipping the rubber in the solutions. The penetration of the tackifier into the rubber may be aided by roughening the surface of the rubber with a wire brush before or after the solution has been applied As a specific example, the following solution was prepared:

| | Parts by volume |
|---|---|
| Isopropyl chloride | 10 |
| Acetone | 10 |
| Ethyl phthalyl ethyl glycollate | 1 |

Synthetic rubber prepared by copolymerizing in aqueous emulsion 75 parts of butadiene and 25 parts of acrylonitrile was compounded in the conventional manner to form a stock exhibiting no tack. Calendered sheets of this stock $\frac{1}{16}$" thick were brushed with the above tackifying solutions, allowed to dry, and pressed together. The above solution imparted fairly good tack to the surfaces after 1 minute, and the tack persisted for some time after the treatment. In one test, it was found that after twenty-four hours, the stocks cohered when pressed together and could not be pulled apart without tearing the stocks.

Equivalent results were obtained when methyl ethyl ketone, ethylene dichloride, a mixture of methyl ethyl ketone and ethylene dichloride, and a mixture of ethylene dichloride and acetone were employed as the solvent. Other alkyl phthalyl alkyl glycollates also gave satisfactory results, but the ethyl phthalyl ethyl glycollate is the preferred material.

The concentration of the glycollate has an important effect upon the efficacy of the solution as a tackifier. When the glycollate is present in concentrations of between 5–10% by volume the best results are obtained. Some tackifying action is still observed when the concentration of glycollate is about 20% by volume, but solutions containing 33% and 50% of glycollate do not function as tackifiers when one coat is brushed upon the rubber in the conventional manner. Solutions more dilute than 5% can be employed if several coats are brushed upon the surface.

Although the synthetic rubber in the specific examples was formed by the copolymerization in aqueous emulsion of 75 parts of butadiene and 25 parts of acrylonitrile, copolymers formed from other mixtures such as 65:35 and 55:45 mixtures of butadiene and acrylonitrile, or copolymers formed from mixtures of butadiene and other unsaturated nitriles having the structural formula $$CH_2=C-C=N$$
$$|$$
$$R$$

wherein R represents hydrogen or an alkyl group may be employed. Examples of such materials are alpha-methacrylonitrile, alpha-ethacrylonitrile, etc.

While I have herein disclosed specific examples of my invention, the invention is by no means limited thereto, for many variations and modifications are within the spirit and scope of the invention as defined in the appended claims.

I claim:

1. The method of imparting tack to an unvulcanized synthetic rubber prepared by copolymerizing in aqueous emulsion a mixture of butadiene-1,3 and a lesser amount of an unsaturated nitrile having the structural formula $$CH_2=C-C=$$
$$|$$
$$R$$

wherein R represents a member of the class consisting of hydrogen and alkyl which comprises, applying to the surface of the rubber a solution of an alkyl phthalyl alkyl glycollate in a volatile organic solvent, the concentration of the glycollate being not over about 20% by volume, and allowing the solvent to evaporate.

2. The method of imparting tack to an unvulcanized synthetic rubber prepared by copolymerizing in aqueous emulsion a mixture of butadiene-1,3 and acrylonitrile containing between about 25 and 45% of acrylonitrile which comprises applying to the surface of the rubber a solution of an alkyl phthalyl alkyl glycollate in a volatile organic solvent, the concentration of the glycollate being not over about 20% by volume, and allowing the solvent to evaporate.

3. The method of claim 2 in which the glycollate is ethyl phthalyl ethyl glycollate.

4. The method of imparting tack to an unvulcanized synthetic rubber prepared by copolymerizing in aqueous emulsion a mixture of butadiene-1,3 and a lesser amount of acrylonitrile which comprises applying to the surface of the rubber a solution of an alkyl phthalyl alkyl glycollate in a volatile organic solvent, the concentration of the glycollate being between about 5 and 10% by volume, and allowing the solvent to evaporate.

5. The method of claim 4 in which the volatile organic solvent comprises acetone.

6. The method of claim 4 in which the glycollate is ethyl phthalyl ethyl glycollate and the volatile organic solvent comprises acetone.

DONALD V. SARBACH.